United States Patent
Avitia et al.

(10) Patent No.: US 12,105,481 B1
(45) Date of Patent: Oct. 1, 2024

(54) SYSTEM AND METHOD FOR AUTOMATIC DEPTH POSITIONING OF WIRE CONVEYED OPERATIONS

(71) Applicant: HORIZONTAL WIRELINE SERVICES, LLC, Irwin, PA (US)

(72) Inventors: Manuel Avitia, Irwin, PA (US); Joseph Sites, Venetia, PA (US)

(73) Assignee: HORIZONTAL WIRELINE SERVICES, LLC, Irwin, PA (US)

( * ) Notice: Subject to any disclaimer, the term of this patent is extended or adjusted under 35 U.S.C. 154(b) by 0 days.

(21) Appl. No.: 18/604,864

(22) Filed: Mar. 14, 2024

Related U.S. Application Data

(60) Provisional application No. 63/490,292, filed on Mar. 15, 2023.

(51) Int. Cl.
  *G05B 11/42* (2006.01)
  *G05B 11/32* (2006.01)

(52) U.S. Cl.
  CPC .............. *G05B 11/42* (2013.01); *G05B 11/32* (2013.01)

(58) Field of Classification Search
  CPC ................................ G05B 11/42; G05B 11/32
  USPC .......................................................... 700/42
  See application file for complete search history.

(56) References Cited

U.S. PATENT DOCUMENTS

| | | |
|---|---|---|
| 4,117,600 A | 10/1978 | Guignard et al. |
| 4,282,523 A | 8/1981 | Youmans |
| 4,534,228 A | 8/1985 | Burbank, Jr. |
| 4,676,310 A | 6/1987 | Scherbatskoy et al. |
| 4,924,596 A | 5/1990 | Vachon |
| 5,062,048 A | 10/1991 | Coulter et al. |
| 5,176,364 A | 1/1993 | Bell |
| 5,279,366 A | 1/1994 | Scholes |
| 5,305,830 A | 4/1994 | Wittrisch |
| 5,351,531 A | 10/1994 | Kerr |
| 6,216,789 B1 | 4/2001 | Lorsignol et al. |
| 6,343,515 B1 | 2/2002 | Dodson |
| 6,618,675 B2 | 9/2003 | Strickland |
| 6,704,655 B2 | 3/2004 | Kelly |
| 7,140,435 B2 | 11/2006 | Defretin et al. |
| 7,225,878 B2 | 6/2007 | Holcomb et al. |
| 7,458,421 B2 | 12/2008 | Barrow et al. |
| 7,717,193 B2 | 5/2010 | Egilsson et al. |
| 7,770,639 B1 | 8/2010 | Pledger |
| 7,900,893 B2 | 3/2011 | Teurlay et al. |
| 8,151,902 B2 | 4/2012 | Lynde et al. |

(Continued)

FOREIGN PATENT DOCUMENTS

| | | |
|---|---|---|
| CN | 104153762 B | 8/2016 |
| CN | 114704244 A | 7/2022 |

(Continued)

OTHER PUBLICATIONS

Ahmadzamri et al. "Development and Testing of Advanced Wireline Conveyance Technology for Rugose Open Hole Conditions", IPTC 2014: International Petroleum Technology Conference. EAGE Publications BV, 2014 (10 pages).

(Continued)

*Primary Examiner* — Jigneshkumar C Patel
(74) *Attorney, Agent, or Firm* — Trop, Pruner & Hu, P.C.

(57) ABSTRACT

An embodiment includes a system for automatic depth positioning of wire conveyed operations using proportional-integral-derivative (PID) control loops.

15 Claims, 9 Drawing Sheets

(56) References Cited

U.S. PATENT DOCUMENTS

| | | |
|---|---|---|
| 8,573,313 B2 | 11/2013 | Lovell et al. |
| 8,678,352 B2 | 3/2014 | Lawson et al. |
| 9,162,853 B2 | 10/2015 | Ives et al. |
| 9,206,658 B1 | 12/2015 | Dion |
| 9,389,130 B2 | 7/2016 | Teurlay et al. |
| 9,410,419 B2 | 8/2016 | Coles |
| 9,617,814 B2 | 4/2017 | Seals et al. |
| 9,810,032 B2 | 11/2017 | Dion |
| 9,879,487 B2 | 1/2018 | Bell et al. |
| 9,976,367 B2 | 5/2018 | Dykstra et al. |
| 9,982,530 B2 | 5/2018 | Walton et al. |
| 10,034,067 B1 | 7/2018 | Palmgren, III et al. |
| 10,161,194 B2 | 12/2018 | Clemens et al. |
| 10,233,705 B2 | 3/2019 | Dion |
| 10,280,724 B2 | 5/2019 | Hinderliter |
| 10,301,892 B2 | 5/2019 | Castillo et al. |
| 10,323,508 B2 | 6/2019 | Coles et al. |
| 10,371,012 B2 | 8/2019 | Davis et al. |
| 10,408,030 B2 | 9/2019 | Oehring et al. |
| 10,443,325 B2 | 10/2019 | Zheng et al. |
| 10,597,967 B2 | 3/2020 | Smith et al. |
| 10,738,589 B2 | 8/2020 | Chatelet et al. |
| 10,745,984 B2 | 8/2020 | Dion |
| 10,767,419 B2 | 9/2020 | Sigurdson |
| 10,865,068 B2 | 12/2020 | Dion et al. |
| 10,961,839 B2 | 3/2021 | Schlosser |
| 10,988,993 B2 | 4/2021 | Phelps et al. |
| 11,088,834 B2 | 5/2021 | Priser et al. |
| 11,028,672 B2 | 6/2021 | Jeanson |
| 11,035,207 B2 | 6/2021 | Oehring et al. |
| 11,053,757 B2 | 7/2021 | Lubojasky et al. |
| 11,060,368 B2 | 7/2021 | Fundytus et al. |
| 11,428,092 B2 | 8/2022 | Billingham et al. |
| 11,434,103 B2 | 9/2022 | Dion et al. |
| 11,448,026 B1 | 9/2022 | Al-Mousa et al. |
| 11,466,527 B2 | 10/2022 | Fuglestad |
| 11,499,372 B2 | 11/2022 | Qi et al. |
| 11,499,414 B2 | 11/2022 | Hradecky et al. |
| 2002/0077753 A1* | 6/2002 | Kelly ................ G01V 11/002 702/1 |
| 2009/0173493 A1 | 7/2009 | Hutin et al. |
| 2014/0166270 A1 | 6/2014 | Varkey et al. |
| 2015/0027736 A1 | 1/2015 | Smaardyk et al. |
| 2015/0285069 A1 | 10/2015 | Mann et al. |
| 2017/0145760 A1 | 5/2017 | Poyet et al. |
| 2017/0241221 A1* | 8/2017 | Seshadri ............... E21B 47/024 |
| 2018/0051540 A1* | 2/2018 | Castillo ................ E21B 47/007 |
| 2018/0347339 A1 | 12/2018 | Zheng et al. |
| 2019/0003329 A1 | 1/2019 | Morris et al. |
| 2019/0169971 A1 | 6/2019 | Oehring et al. |
| 2019/0203552 A1 | 7/2019 | Goodman |
| 2019/0211661 A1 | 7/2019 | Reckels et al. |
| 2020/0157922 A1 | 5/2020 | Stout et al. |
| 2020/0270979 A1* | 8/2020 | Hradecky ............... E21B 47/12 |
| 2021/0164301 A1 | 6/2021 | Su et al. |
| 2021/0262303 A1* | 8/2021 | Venna ................ E21B 47/12 |
| 2022/0162921 A1 | 5/2022 | Losh |
| 2023/0014986 A1 | 1/2023 | Qi et al. |
| 2023/0015244 A1 | 1/2023 | Al-Mousa et al. |
| 2023/0058152 A1 | 2/2023 | Qi et al. |

FOREIGN PATENT DOCUMENTS

| | | |
|---|---|---|
| WO | 2014188203 A1 | 11/2014 |
| WO | 2022126237 A1 | 6/2022 |

OTHER PUBLICATIONS

Wilson et al., "Depth Control: Reconciliation of LWD and Wireline Depths, Standard Practice and an Alternative Simple But Effective Method", SPE Annual Technical Conference and Exhibition, OnePetro, 2004 (11 pages).

Fitzgerald et al., "A technique for improving the accuracy of wireline depth measurements", SPE Annual Technical Conference and Exhibition, OnePetro, 2007 (12 pages).

Larimore et al., "Improved Depth Control for Slickline Increases Efficiency in Wireline Services", Journal of Canadian Petroleum Technology 36.08 (1997) (8 pages).

Wikipedia, "PID Controller", downloaded Jan. 30, 2023.

Wireline and Perforating, Halliburton Auto Pumpdown Service "Consistent, Efficient Plug-and-Perf Operations Every Well, Every Crew, Every Time", Halliburton, 2003 (1 page).

Electronic Power Design, "Fracking Mobile Substation Project", downloaded on Sep. 14, 2022 from https://www.electronicpowerdesign.com/news/fracking-mobile-substation-project/.

Wikipedia, "Variable-frequency drive", downloaded from https://en.wikipedia.org/wiki/Variable-frequency_drive, last updated Feb. 2, 2024.

International Searching Authority, International Search Report and Written Opinion dated Jul. 15, 2024 in International Application No. PCT/US2024/019876 (13 pages).

* cited by examiner

300

//As per described on the steps, the following pseudocode represents the process being followed.

(301) // 1) Define The requested Depth.
Requested_Depth = Input("Requested Depth") // This input can be a user input, or a system API.

(302) //2) Obtain the current Depth Measurement, and compare it
Measured_Depth = Input("Actual Depth") // This is an actual measurement from a depth measuring system.
Depth_Difference = (Requested_Depth - Measured_Depth);

(303) //3) Use the Depth Error as the Input for the Depth PID Control to obtain a Requested Movement
Requested_Movement = Depth_PID(0, Depth_Difference).output //Refer to the Depth PID Function.

(304) //4) Use the Requested Movement, and compare it to the Measured Wire Speed Movement to obtain Speed Error.
Measured_Speed = Input ("Actual Speed")// This is an actual measurement from a speed measuring system.
Speed_Error = (Measured_Speed - Requested_Movement)

(305) //5) Use The Speed Error as the Input for the Speed PID.
Speed_Command = Speed_PID(0, Speed_Error).output (306) //6) Use the Speed PID Output as the Speed Command for the Motor Control.
Motor.Speed= Speed_Command (307) //7) Use the Requested Movement, and Compare them with the tension limits to Obtain a Tension Error
Minimum_Tension = input("Minimum Tension") // This is a process Variable
Maximum_Tension = input("Maximum Tension") // This is a process Variable
(311) Measured_Tension = Input ("Actual Tension") //This is an actual measurement from a tension measuring system.
if Requested_Movement < 0 do //Requesting a Movement in the upward direction.
Tension_Error = (Maximum_Tension - Measured_Tension)
(310) end
if Requested_Movement > 0 do // Requesting a Movement in downward direction. (312)
Tension_Error = (Measured_Tension - Minimum_Tension) (313)
end Tension_Command = Tension_PID(0, Tension_Error).output (308) //8) Use Tension Error as the input for the Tension PID Control.

(309) 9) Use the Output of the Tension PID control as the Input for the Motor Control Torque.
Motor.Torque = Tension_Command

Fig. 3

```
// Continous loop of Depth_PID, must run as a separate loop.
function Depth_PID(setpoint, measured_value)
    dt := 100 //Loop at least every 100ms
    A0 := Kp + Ki*dt + Kd/dt
    A1 := -Kp - 2*Kd/dt
    A2 := Kd/dt
    error[2] := 0  // e(t-2)
    error[1] := 0  // e(t-1)
    error[0] := 0  // e(t)
    Depth_PID.output := u0   // Initial Value loop:
        error[2] := error[1]
        error[1] := error[0]
        error[0] := setpoint - measured_value
(401)   Depth_PID.output := Depth_PID.output + A0 * error[0] + A1 * error[1] + A2 * error[2]
        wait(dt)
        goto loop
```

Fig. 4A

```
// Continous Loop of Speed_PID , must run as a separate loop.
function Speed_PID(setpoint, measured_value)
dt := 100 //Loop at least every 100ms
A0 := Kp + Ki*dt + Kd/dt
A1 := -Kp - 2*Kd/dt
A2 := Kd/dt
error[2] := 0 // e(t-2)
error[1] := 0 // e(t-1)
error[0] := 0 // e(t)
Speed_PID.output := u0   // Initial Value loop:
    error[2] := error[1]
    error[1] := error[0]
    error[0] := setpoint - measured_value
    Speed_PID.output := Speed_PID.output + A0 * error[0] + A1 * error[1] + A2 * error[2]
    wait(dt)
    goto loop
```

Fig. 4B

```
// Continous Loop of Tension_PID, must run as a separate loop.
function Tension_PID(setpoint, measured_value)
dt := 100 //Loop at least every 100ms
A0 := Kp + Ki*dt + Kd/dt
A1 := -Kp - 2*Kd/dt
A2 := Kd/dt
error[2] := 0 // e(t-2)
error[1] := 0 // e(t-1)
error[0] := 0 // e(t)
Tension_PID.output := u0   // Initial Value loop:
    error[2] := error[1]
    error[1] := error[0]
    error[0] := setpoint - measured_value
    Tension_PID.output := Tension_PID.output + A0 * error[0] + A1 * error[1] + A2 * error[2]
    wait(dt)
    goto loop
```

Fig. 4C

SYSTEM AND METHOD FOR AUTOMATIC DEPTH POSITIONING OF WIRE CONVEYED OPERATIONS

CROSS-REFERENCE TO RELATED APPLICATION

This application claims priority to U.S. Provisional Patent Application No. 63/490,292 filed on Mar. 15, 2023 and entitled "System and Method for Automatic Depth Positioning of Wire Conveyed Operations", the content of which is hereby incorporated by reference.

TECHNICAL FIELD

Embodiments of the invention are in the field of energy services and, in particular, oil and gas services, where wireline or slickline services are required.

BACKGROUND

Multiple types of conveyance machines are used in the oil and gas industry to convey tools and expendable materials into oil and gas wells. These machines are often operated manually by controlling the direction and torque of the conveyance system in order for the tool or other product to reach a desired depth within the well. The machines may use a mechanical device, typically named wireline for stranded cable, or slickline for single stranded wire. The mechanical device is reeled onto a drum, and this drum is moved by a motor, which typically is pneumatic, hydraulic, or electric.

In order to identify the existing depth of the tool or other product a set of wheels and encoders may be used to obtain depth feedback. In order to identify tension applied on the wire, a loadcell may be used to obtain tension feedback.

The process of conveying tools and expendable materials into wells requires precise control of the depth, and tension, in order to prevent incidents that can compromise the integrity of the personnel, wire, well, or the conveyed materials.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 3 includes pseudocode for an embodiment of automatic depth positioning of wire conveyed operations.

FIGS. 4A, 4B, and 4C include pseudocode for embodiments of automatic depth positioning of wire conveyed operations.

DETAILED DESCRIPTION

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Figure 1:
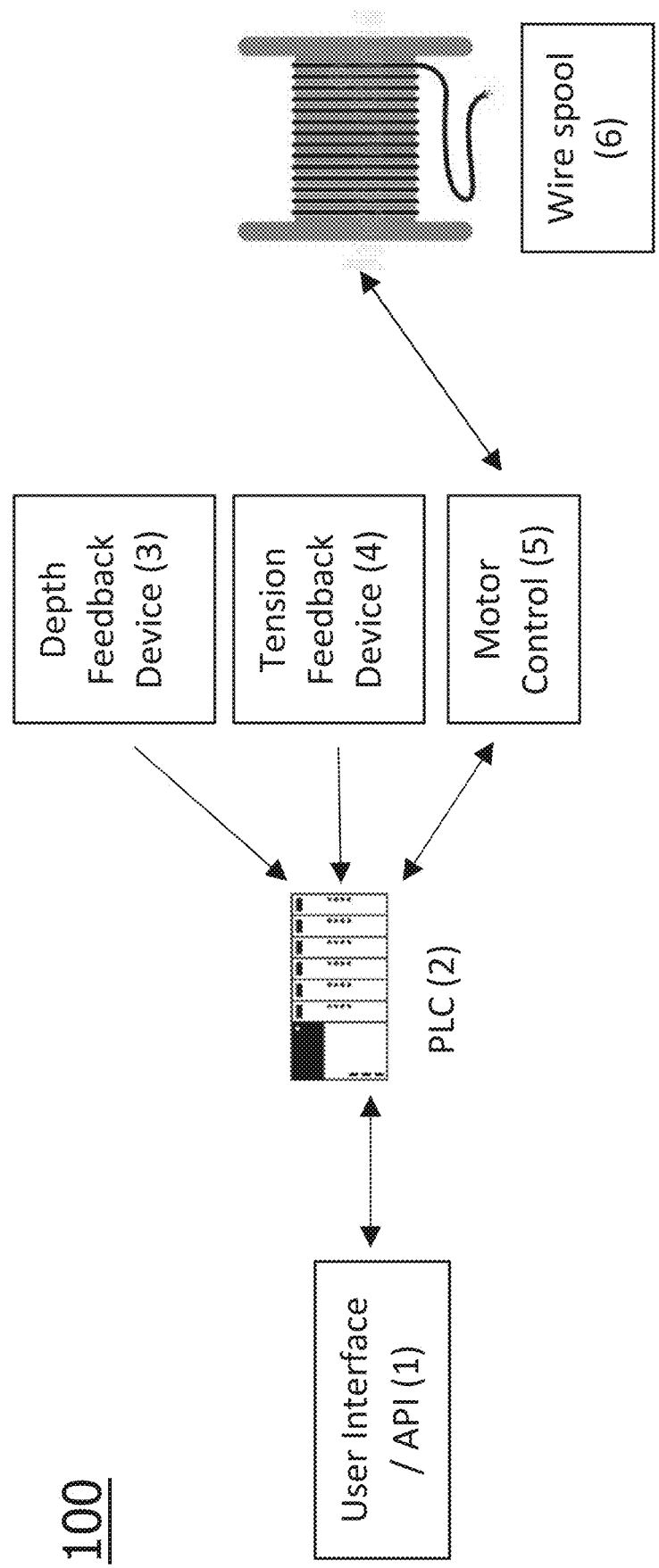
FIG. 1 includes an embodiment of a system for automatic depth positioning of wire conveyed operations.

FIG. 1 includes an embodiment of a system 100 for automatic depth positioning of wire conveyed operations. Wire spool 6 is used to wind or otherwise manipulate line, such as wireline or slick line. The spool is actuated by a motor, which is in turn controlled by motor controller 5. Motor controller 5, line depth feedback system/device 3, and tension feedback system/device 4 are all coupled to programmable logic computer (PLC) 2. The PLC may receive input from graphical user interface (GUI) and/or application program interface (API) 1. Such systems interact together, in order to perform an automated wire conveyed process. The user of system 100 may be a human or a separate computing system. User interface 1 provides communication aids to interact with PLC 1. User interface 1 has provisions to load files from work instructions and rearrange them in step by step predefined "Stop Depths" where key activities of the job description take place. In an embodiment, PLC 2 utilizes three interlaced closed loop proportional-integral-derivative (PID) control loops to perform requested movements, with smooth transitions and within predefined operational tension, speed, and/or depth ranges.

Figure 2:
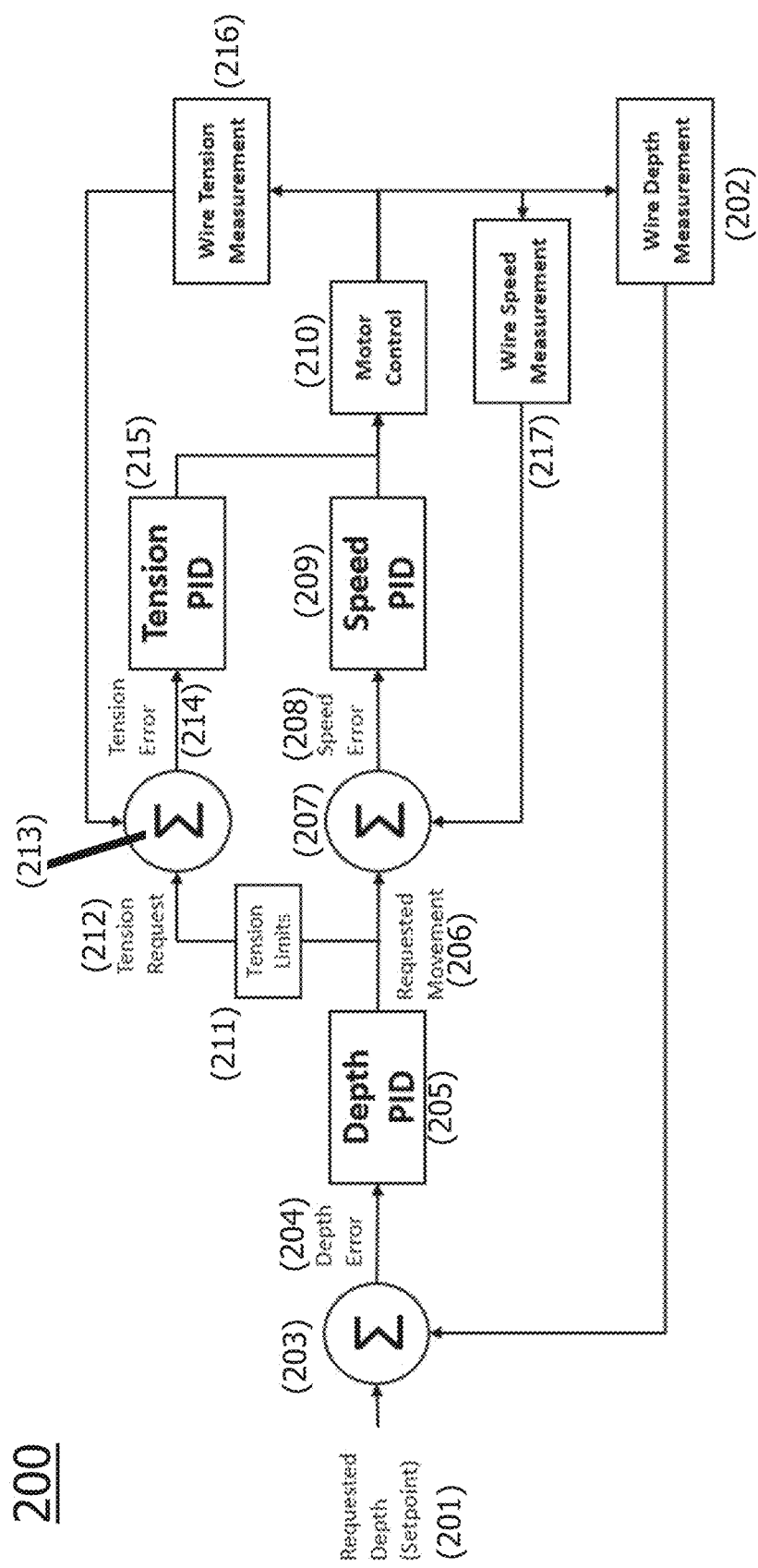
FIG. 2 includes an embodiment of a system for automatic depth positioning of wire conveyed operations.

FIG. 2 includes an embodiment of a system for automatic depth positioning of wire conveyed operations.

Process 200 includes various stages. At 201 the process defines a requested depth for a portion of the line. The portion of the line may include a portion of braided line, a tool coupled to the line (which is still considered a "portion of the line"), a material coupled to the line (which is still considered a "portion of the line"), and the like. With a PID control loop, this value is a setpoint. At 202, the system obtains the current depth measurement of the line portion via at least one sensor. At 203 the system compares the values from locations 201, 202 to generate depth error 204. The system uses the depth error as the input for the depth PID control loop 205 to obtain requested movement 206. An example of requested movement 206 is 5,000 ft. The system uses requested movement 206 and compares it, at location 207, to current wire speed measurement 217 to obtain speed error 208. The system uses the speed error as the input for speed PID control loop 209. The system uses the speed PID control loop output as a speed command or instruction for motor control 201. Further, the system uses requested movement 206 (in combination with tension limits 211 and a requested tension 212) and compares it to wire tension measurements (216) to obtain tension error 214. The system uses tension error 214 as the input for tension PID control loop 215. The system uses the output of the tension PID control loop as an input for controlling motor torque via motor control 210. Further details of process 200 are address in FIG. 3 and FIGS. 4A, 4B, 4C.

FIG. 3 includes pseudocode for an embodiment of automatic depth positioning of wire conveyed operations. For example, the pseudocode of FIG. 3 may be used to implement the system of FIG. 2. Note the use of "Depth_PID", "Speed_PID", and "Tension_PID" in FIG. 3. Example pseudocode for each of these control loops may be found, respectively, in FIGS. 4A, 4B, and 4C.

A PID controller (or multi-term controller) is a control loop mechanism employing feedback. A PID controller continuously calculates an error value e(t) as the difference between a desired setpoint (SP) and a measured process variable (PV) and applies a correction based on proportional, integral, and derivative terms (denoted P, I, and D respectively). A PID controller automatically applies an accurate and responsive correction to a control function.

A PID controller may use, for example, three control terms of proportional, integral and derivative influence on the controller output to apply accurate and optimal control. A PID controller, which continuously calculates an error value e(t) as the difference between a desired setpoint SP=r(t) and a measured process variable PV=y(t): e(t)=r(t)−y(t), applies a correction based on proportional, integral, and derivative terms. The controller attempts to minimize the error over time by adjustment of a control variable u(t), such as the opening of a control valve, to a new value determined by a weighted sum of the control terms.

Term P is proportional to the current value of the SP-PV error e(t). For example, if the error is large, the control output will be proportionately large by using the gain factor "Kp". Term I accounts for past values of the SP-PV error and integrates them over time to produce the I term. For example, if there is a residual SP-PV error after the application of proportional control, the integral term seeks to eliminate the residual error by adding a control effect due to the historic cumulative value of the error. When the error is eliminated, the integral term will cease to grow. This will result in the proportional effect diminishing as the error decreases, but this is compensated for by the growing integral effect. Term D is a best estimate of the future trend of the SP-PV error, based on its current rate of change. It is sometimes called "anticipatory control", as it is effectively seeking to reduce the effect of the SP-PV error by exerting a control influence generated by the rate of error change. The more rapid the change, the greater the controlling or damping effect FIGS. 5, 6, 7 includes systems for enabling embodiments of systems for automatic depth positioning of wire conveyed operations.

Figure 5:
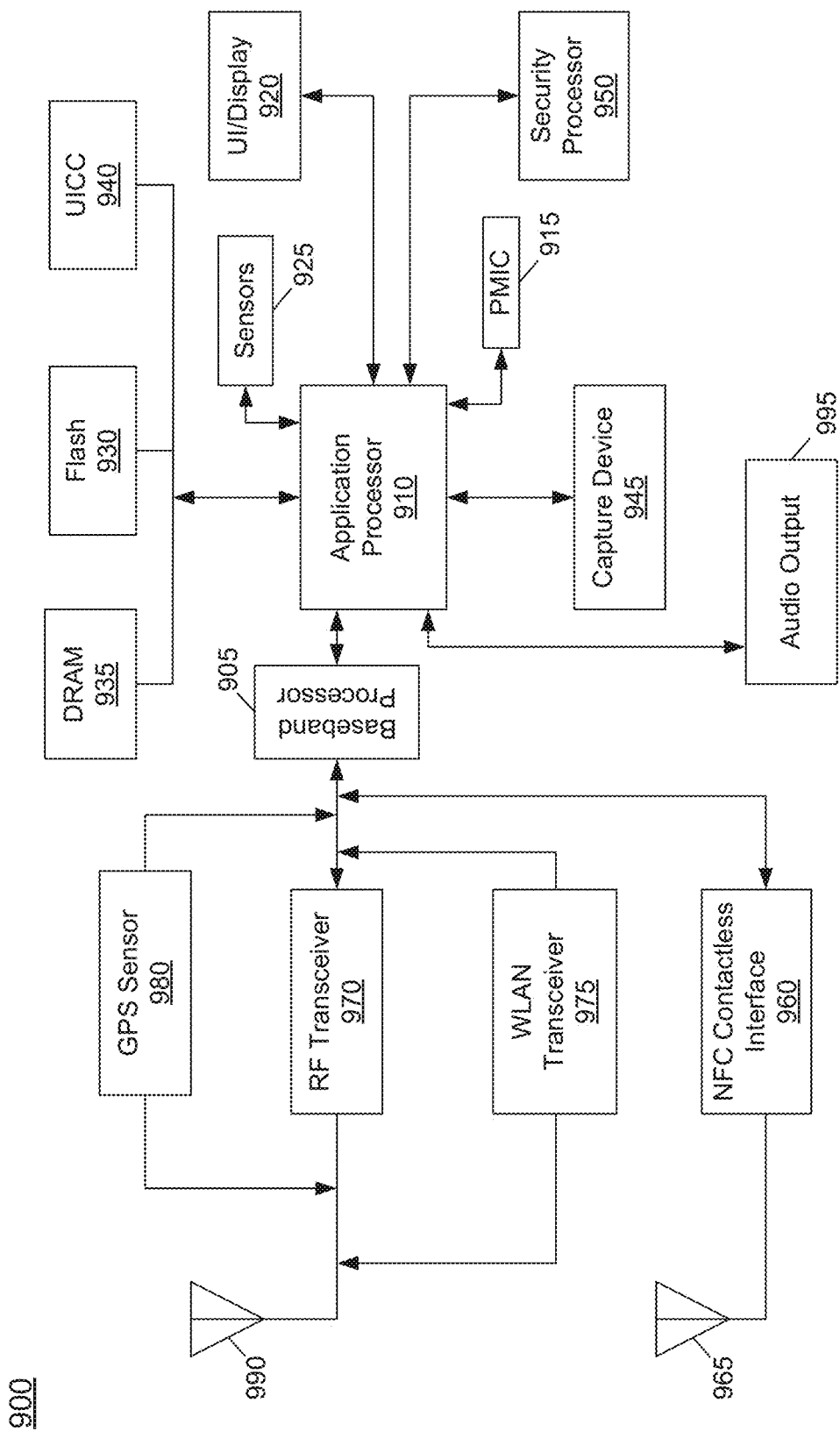
FIGS. 5, 6, 7 includes systems for enabling embodiments of systems for automatic depth positioning of wire conveyed operations.

FIG. 5 includes a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system.

In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935.

As further seen, application processor 910 also couples to a capture device 945 such as one or more image capture devices that can record video and/or still images.

A universal integrated circuit card (UICC) 940 comprises a subscriber identity module, which in some embodiments includes a secure storage to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices may be used to receive, for example, user biometric input for use in authentication operations.

As further illustrated, a near field communication (NFC) contactless interface 960 is provided that communicates in an NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more internet of things (IoT) networks, various circuits may be coupled between baseband processor 905 and antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 5G wireless communication protocol such as in accordance with a code division multiple access (CDMA), global system for mobile communication (GSM), long term evolution (LTE) or other protocol. In addition, a GPS sensor 980 may be present, with location information being provided to security processor 950. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Figure 6:
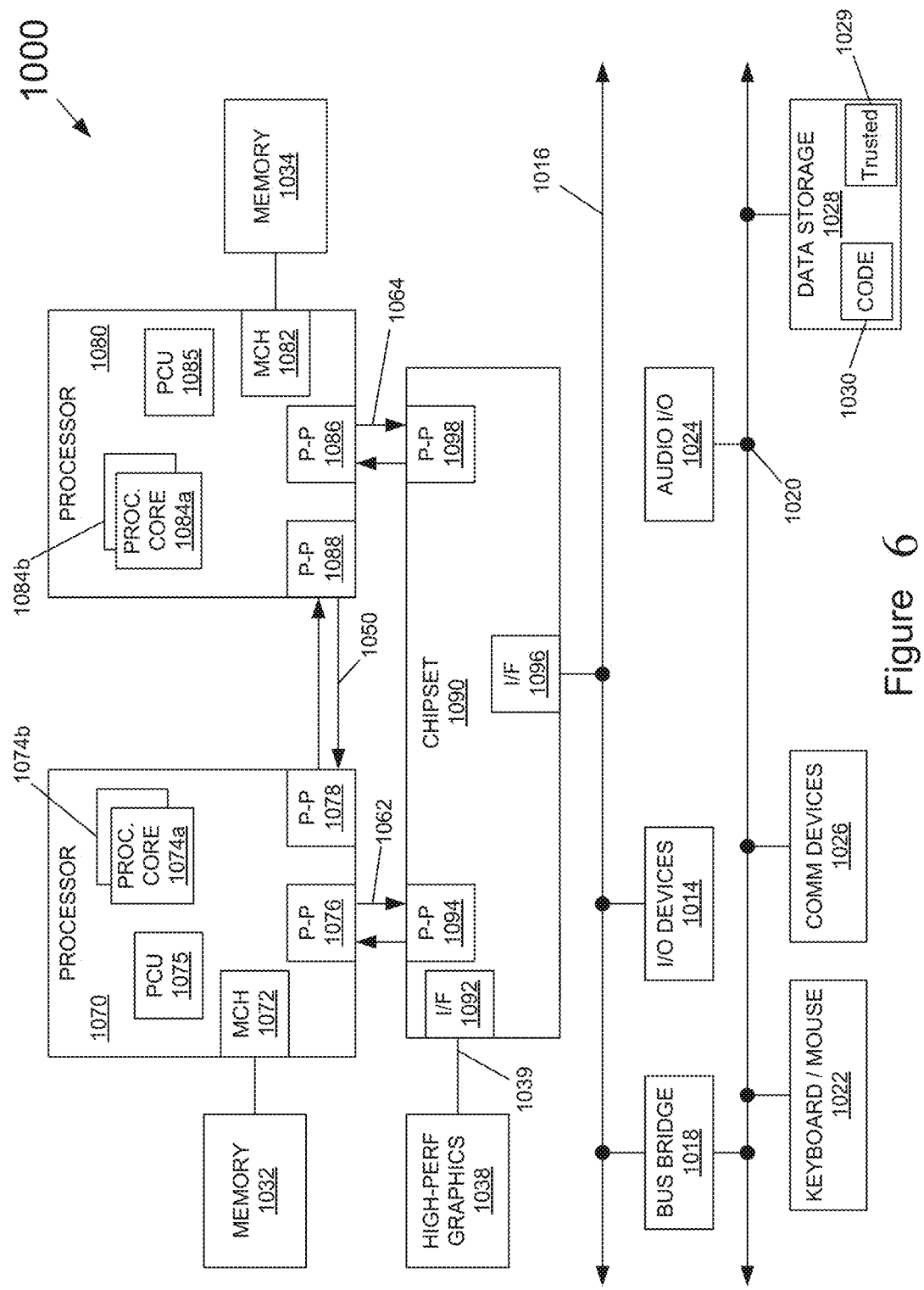

FIG. 6 shows a block diagram of a system in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074a and 1074*b* and processor cores 1084*a* and 1084*b*), although potentially many more cores may be present in the processors. In addition, processors 1070 and 1080 each may include power controller unit 1075 and 1085. In addition, processors 1070 and 1080 each may include a secure engine to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1062 and 1064, respectively. Chipset 1090 includes P-P interfaces 1094 and 1098.

Furthermore, chipset 1090 includes an interface 1092 to couple chipset 1090 with a high-performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 7:
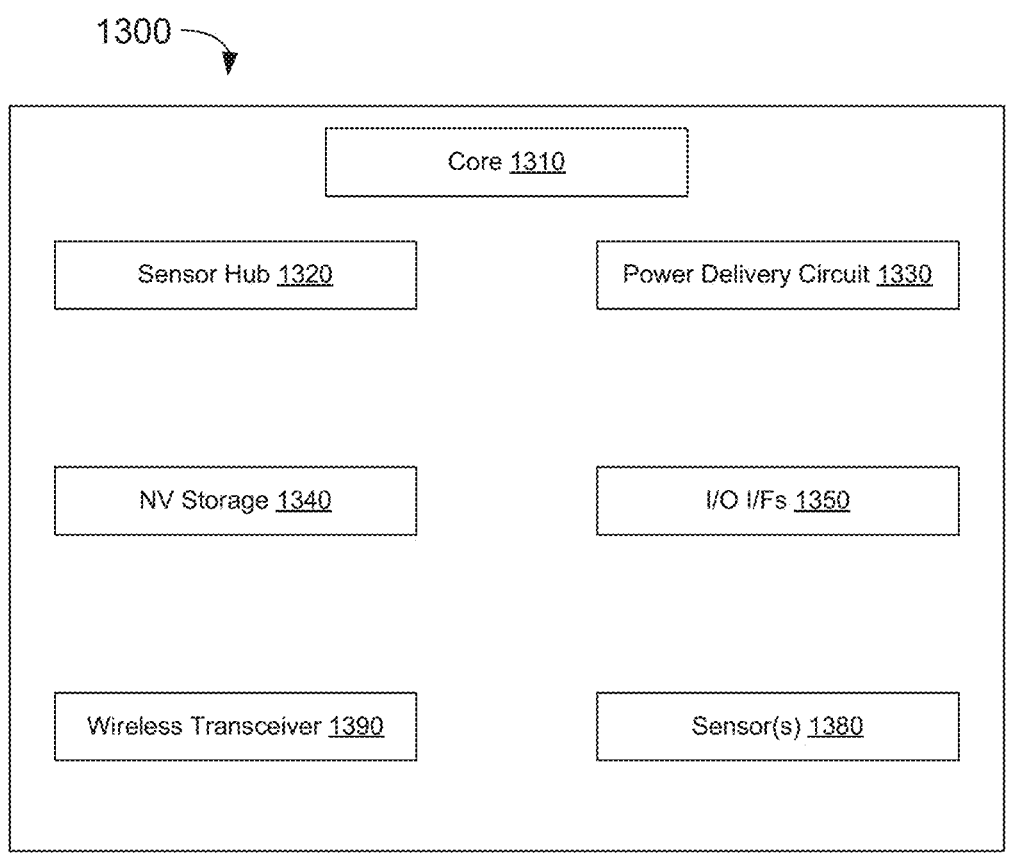

FIG. 7 depicts an IoT environment that may include wearable devices or other small form factor IoT devices. In one particular implementation, wearable module 1300 may be an Intel® Curie™ module that includes multiple components adapted within a single small module that can be implemented as all or part of a wearable device. As seen, module 1300 includes a core 1310 (of course in other embodiments more than one core may be present). Such a core may be a relatively low complexity in-order core, such as based on an Intel Architecture® Quark™ design. In some embodiments, core 1310 may implement a Trusted Execution Environment (TEE). Core 1310 couples to various components including a sensor hub 1320, which may be configured to interact with a plurality of sensors 1380, such as one or more biometric, motion, environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. In different implementations a wearable module can take many other forms. Wearable and/or IoT devices have, in comparison with a typical general-purpose CPU or a GPU, a small form factor, low power requirements, limited instruction sets, relatively slow computation throughput, or any of the above.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, and the like. Program code may be transmitted in the form of packets, serial data, parallel data, and the like, and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

Example sets now follow.

Example 1 includes a system comprising a line including at least one of a wire line, a slick line, or combinations thereof, the line including a line portion. The system includes a spool coupled to the line and a motor coupled to the spool, the motor being configured to actuate the spool to raise or lower the line portion. The system includes at least one processor coupled to at least one sensor, a user interface, and at least one memory, the at least one processor being configured to: (1) in response to a depth input from the user interface, determine a requested depth for the line portion; (301), (2) in response to data from the at least one sensor, determine a current depth of the line portion, a current speed of the line portion, and a current tension of the line; (302), (304), (3) determine a depth error based on both the current depth and the requested depth; (302) (4) determine a requested movement of the line portion via a depth proportional-integral-derivative (PID) control loop, the depth PID control being based on the depth error; (303) (5) determine a speed error based on both the requested movement and the current speed; (304) (6) determine one or more speed instructions via a speed PID control loop, the speed PID control loop being based on the speed error; (305, 306) (7) determine a tension error based on both the requested movement and the current tension; (307) (8) determine one or more tension instructions via a tension PID control loop, the tension PID control loop being based on the tension error; (307, 309), (9) actuate the motor based on both the one or more speed instructions and the one or more tension instructions to adjust a depth of the line portion (210).

For example, in FIG. 3, the system will "determine a tension error based on both the requested movement and the current tension" as shown at 310, 311.

The embodiment of Example 1 addresses, for example, a process of conveying tools and/or expendable materials into a well with precise control of the depth, speed, and tension, which may help prevent incidents that can compromise the integrity of the personnel, wire, well, or the conveyed materials.

Advantages are gained by using each of depth, speed, and tension. Further advantages are gained by using speed and tension in parallel with each other (see blocks 209, 215). Further advantages are gained by basing both of speed and tension on depth (see blocks 205, 209, 215).

An objective to be performed on a well is to position perforating devices, or tools, in a specific location of the well. Hence, depth location is a key objective. In order to position a tool/wireline portion at a particular depth, a system must produce some movement on the tool by increasing or reducing the tension in the wireline. This increase or decrease will induce a certain speed. The system must, in an embodiment, further ensure the speed is kept within certain limits to prevent potential issues on the conveying equipment (e.g., cable, pressure control equipment, or winch).

In order to achieve a desired depth (a key objective), both speed and tension need to be accurately controlled and with equal importance. Hence, speed and tension are addressed in parallel as the they are related to each other but controlled independently. This arrangement provides for more accurate depth positioning.

Example 2. The system of Example 1, wherein the at least one processor is configured to: in response to a maximum tension input from the user interface, determine the tension instruction via the tension PID control loop, the tension PID control loop being based on the maximum tension input.

For example, as shown in FIG. 3, in some embodiments "the tension PID control loop being based on the maximum tension input" is shown at 312.

Example 3. The system of Example 2, wherein the at least one processor is configured to: (1) determine the requested movement is to move the line portion up and not down; (2) in response to determining the requested movement is to move the line portion up and not down, determine the tension error based on the maximum tension input.

For example, see FIG. 3, area 310.

Example 4. The system of Example 1, wherein the at least one processor is configured to: in response to a minimum tension input from the user interface, determine the tension instruction via the tension PID control loop, the tension PID control loop being based on the minimum tension input.

For example, see FIG. 3, area 313.

Example 5. The system of Example 2, wherein the at least one processor is configured to: (1) determine the requested movement is to move the line portion down and not up; (2) in response to determining the requested movement is to move the line portion down and not up, determine the tension error based on the minimum tension input.

For example, see FIG. 3, area 310.

Example 6. The system according to any of Examples 1 to 5, wherein the speed error and the tension error are both based on the requested movement.

See, e.g., FIG. 2 wherein area 206 is an input, directly or indirectly, to areas 207, 213. Thus, "based on" may mean direct or indirect.

Example 7. The system of Example 6, wherein: (1) the requested movement is a set point for the speed PID control loop; (2) the requested movement, after modification with a tension limit, is a set point for the tension control loop.

For an example of modification with a tension limit, see block 211 of FIG. 2.

Alternative version of Example 7. The system of Example 6, wherein the requested movement is a set point for both the speed PID control loop.

Example 8. The system according to any of Examples 1 to 7, wherein the at least one controller includes a depth PID controller to operate the PID control loop, a tension PID controller to operate the tension PID control loop, and a speed PID controller to operate the speed PID control loop.

Example 9. The system according to any of Examples 1 to 8, wherein the one or more speed instructions comprise a speed control manipulated variable and the one or more tension instructions comprise a tension control manipulated variable.

Example 10. The system according to any of Examples 1 to 9, wherein: (1) the tension PID control loop applies correction to the tension error based on proportional, integral, and derivative tension terms; (2) the speed PID control loop applies correction to the speed error based on proportional, integral, and derivative speed terms; (3) the depth PID control loop applies correction to the depth error based on proportional, integral, and derivative depth terms.

For example, see FIG. 4A regarding the depth PDI control loop. A0, for example, includes Kp (which facilitates proportional correction), Ki (which facilitates integral correction), and Kd (which facilitates derivative correction). The "K" in these values is a tuning coefficient. Note how at 401 all of A0, A1, A2 are used to apply correction to render Depth_PID.output (i.e., the depth PID control loop applies correction to the depth error based on proportional, integral, and derivative depth terms).

Regarding FIGS. 4A, 4B, 4C, in an embodiment the PID control loops are meant to run as independent processes from one another and on separate threads. The significance of this is that the processes are mechanically interconnected, but they are controlled independently, in order to avoid conflicts on the control system. This embodiment of the method also adds a layer of redundancy. In the event that one control loop is halted, the rest of the process can maintain control of the process.

Example 1a. At least one machine-readable medium having stored thereon data which, if used by at least one machine, causes the at least one machine to perform operations comprising: (1) in response to a depth input from a user interface or an application program interface (API), determine a requested depth for a line portion, the line portion being included in a line that further includes at least one of a wireline, a slickline, or combinations thereof; (2) in response to data from at least one sensor, determine a current depth of the line portion, a current speed of the line portion, and a current tension of the line; (3) determine a depth error based on both the current depth and the requested depth; (4) determine a requested movement of the line portion via a depth proportional-integral-derivative (PID) control loop, the depth PID control being based on the depth error; (5) determine a speed error based on both the requested movement and the current speed; (6) determine one or more speed instructions via a speed PID control loop, the speed PID control loop being based on the speed error; (7) determine a tension error based on both the requested movement and the current tension; (8) determine one or more tension instructions via a tension PID control loop, the tension PID control loop being based on the tension error; (9) actuate a motor based on both the one or more speed instructions and the one or more tension instructions to adjust a depth of the line portion.

Example 2a. The at least one medium of Example 1a, the operations comprising: in response to a maximum tension input from the user interface, determine the tension instruction via the tension PID control loop, the tension PID control loop being based on the maximum tension input.

Example 3a. The at least one medium of Example 2a, the operations comprising: (1) determine the requested movement is to move the line portion up and not down; (2) in response to determining the requested movement is to move the line portion up and not down, determine the tension error based on the maximum tension input.

Example 4a. The at least one medium of 1a, the operations comprising: in response to a minimum tension input from the user interface, determine the tension instruction via the tension PID control loop, the tension PID control loop being based on the minimum tension input.

Example 5a. The at least one medium of Example 2a, the operations comprising: (1) determine the requested movement is to move the line portion down and not up; (2) in response to determining the requested movement is to move the line portion down and not up, determine the tension error based on the minimum tension input.

Example 6a. The at least one medium of Examples 1a to 5a, wherein the speed error and the tension error are both based on the requested movement.

Example 7a. The at least one medium of Example 6a, wherein the requested movement is a set point for both the speed PID control loop and the tension control loop.

Example 8a. The at least one medium of Examples 1a to 7a, wherein the at least one controller includes a depth PID controller to operate the PID control loop, a tension PID controller to operate the tension PID control loop, and a speed PID controller to operate the speed PID control loop.

Example 9a. The at least one medium of Examples 1a to 8a, wherein the one or more speed instructions comprise a speed control manipulated variable and the one or more tension instructions comprise a tension control manipulated variable.

Example 10a. The at least one medium of Examples 1a to 9a, wherein: (1) the tension PID control loop applies correction to the tension error based on proportional, integral, and derivative tension terms; (2) the speed PID control loop applies correction to the speed error based on proportional, integral, and derivative speed terms; (3) the depth PID control loop applies correction to the depth error based on proportional, integral, and derivative depth terms.

Example 1b. A system comprises a line including at least one of a wire line, a slick line, or combinations thereof, the line including a line portion. The system comprises a spool coupled to the line and a motor coupled to the spool, the motor being configured to actuate the spool to raise or lower the line portion. The system comprises at least one processor coupled to at least one sensor, at least one of a user interface or an application program interface (API), and at least one memory, the at least one processor being configured to: (1) in response to a depth input from the at least one of a user interface or an API, determine a requested depth for the line portion; (2) in response to data from the at least one sensor, determine a current depth of the line portion, a current speed of the line portion, and a current tension of the line; (3) determine a depth error based on both the current depth and the requested depth; (4) determine a requested movement of the line portion based on the depth error; (5) determine a speed error based on both the requested movement and the current speed; (6) determine one or more speed instructions based on the speed error; (7) determine a tension error based on both the requested movement and the current tension; (8) determine one or more tension instructions based on the tension error; (9) actuate the motor based on both the one or more speed instructions and the one or more tension instructions to adjust a depth of the line portion.

Thus, not all embodiments are limited to PID control loops as some embodiments do not require a PID control. Instead, a basic logic control (e.g., based on switches and ramps) may be used. With embodiments that are not based on PID loops, however, the response of the system may be slower, and changes between conditions may be harsher (i.e., the changes may be steps and ramps instead of curves).

Example 2b. The system of Example 1b, wherein the at least one processor is configured to: (1) determine the requested movement via a depth multi-term control loop, the depth multi-term control loop being based on the depth error; (2) determine the one or more speed instructions via a speed multi-term control loop, the speed multi-term control loop being based on the speed error; (3) determine the one or more tension instructions via a tension multi-term control loop, the tension multi-term control loop being based on the tension error.

Thus, not all embodiments are limited to PID control loops or even three-term control loops.

Example 3b. The system according to any of Examples 1b-2b, wherein the at least one processor is configured to: in response to a maximum tension input from the at least one of a user interface or an API, determine the tension instruction based on the maximum tension input.

Example 4b. The system of Example 3b, wherein the at least one processor is configured to: (1) determine the requested movement is to move the line portion up and not down; (2) in response to determining the requested movement is to move the line portion up and not down, determine the tension error based on the maximum tension input.

Example 5b. The system according to any of Examples 1b-2b, wherein the at least one processor is configured to: in response to a minimum tension input from the at least one of a user interface or an API, determine the tension instruction based on the minimum tension input.

Example 6b. The system of Example 5b, wherein the at least one processor is configured to: (1) determine the requested movement is to move the line portion down and not up; (2) in response to determining the requested movement is to move the line portion down and not up, determine the tension error based on the minimum tension input.

Example 7b. The system according to any of Examples 2b, wherein the speed error and the tension error are both based on the requested movement.

Example 8b. The system of Example 7b, wherein the requested movement is a set point for both the speed multi-term control loop and the tension multi-term control loop.

Example 9b. The system of Example 2b, wherein the one or more speed instructions comprise a speed control manipulated variable and the one or more tension instructions comprise a tension control manipulated variable.

Example 10b. The system of Example 2b, wherein: (1) the tension multi-term control loop applies correction to the tension error based on proportional, integral, and derivative tension terms; (2) the speed PID control loop applies correction to the speed error based on proportional, integral, and derivative speed terms; (3) the depth PID control loop applies correction to the depth error based on proportional, integral, and derivative depth terms.

Example 1c. At least one machine-readable medium having stored thereon data which, if used by at least one machine, causes the at least one machine to perform operations comprising: (1) in response to a depth input from at least one of a user interface or an API, determine a requested depth for a line portion, the line portion being included in a line that further includes at least one of a wireline, a slickline, or combinations thereof; (2) in response to data from at least one sensor, determine a current depth of the line portion, a current speed of the line portion, and a current tension of the line; (3) determine a depth error based on both the current depth and the requested depth; (4) determine a requested movement of the line portion based on the depth error; (5) determine a speed error based on both the requested movement and the current speed; (6) determine one or more speed instructions based on the speed error; (7) determine a tension error based on both the requested movement and the current tension; (8) determine one or more tension instructions based on the tension error; (9) actuate a motor based on both the one or more speed instructions and the one or more tension instructions to adjust a depth of the line portion.

Example 2c. The at least one medium of Example 1c, the operations comprising: (1) determine the requested movement via a depth multi-term control loop, the depth multi-term control loop being based on the depth error; (2) determine the one or more speed instructions via a speed multi-term control loop, the speed multi-term control loop being based on the speed error; (3) determine the one or more tension instructions via a tension multi-term control loop, the tension multi-term control loop being based on the tension error.

Example 3c. The at least one medium according to any of Examples 1c-2c, the operations comprising: in response to a maximum tension input from the at least one of a user interface or an API, determine the tension instruction based on the maximum tension input.

Example 4c. The at least one medium of Example 3c, the operations comprising: (1) determine the requested movement is to move the line portion up and not down; (2) in response to determining the requested movement is to move the line portion up and not down, determine the tension error based on the maximum tension input.

Example 5c. The at least one medium of Example 1c-2c, the operations comprising: in response to a minimum tension input from the at least one of a user interface or an API, determine the tension instruction based on the minimum tension input.

Example 6c. The at least one medium of Example 5c, the operations comprising: (1) determine the requested movement is to move the line portion down and not up; (2) in response to determining the requested movement is to move the line portion down and not up, determine the tension error based on the minimum tension input.

Example 7c. The at least one medium of Example 2c, wherein the speed error and the tension error are both based on the requested movement.

Example 8c. The at least one medium of Example 7b, wherein the requested movement is a set point for both the speed multi-term control loop and the tension multi-term control loop.

Example 9c. The at least one medium of Example 2b, wherein the one or more speed instructions comprise a speed control manipulated variable and the one or more tension instructions comprise a tension control manipulated variable.

Example 10c. The at least one medium of Example 2b, wherein: (1) the tension multi-term control loop applies correction to the tension error based on proportional, integral, and derivative tension terms; (2) the speed PID control loop applies correction to the speed error based on proportional, integral, and derivative speed terms; (3) the depth PID control loop applies correction to the depth error based on proportional, integral, and derivative depth terms.

Example 1d. A wireline system comprising a line including at least one of a wire line, a slick line, or combinations thereof, the line including a line portion. The system comprises a spool coupled to the line. The system comprises a motor coupled to the spool, the motor being configured to actuate the spool to raise or lower the line portion. The system comprises at least one controller coupled to the motor and configured to actuate the motor to automate depth positioning of the line portion based on each of: (a) a monitored depth of the line portion, (b) a monitored speed of the line portion, and (c) a monitored tension of the line.

Example 2d. The system of Example 1d, wherein the at least one controller is configured to: (1) determine at least one speed instruction based on the monitored speed of the line portion; (2) determine at least one tension instruction based on the monitored tension of the line; (3) communicate the at least one speed instruction and the at least one tension instruction to the motor to actuate the motor to automate depth positioning of the line portion.

Example 3d. The system of Example 2d, wherein the at least one controller is configured to: (1) in response to a depth input from at least one of a user interface or an application program interface (API), determine a requested depth for the line portion; (2) determine a current depth of the line portion based on the monitored depth of the line portion; (3) determine a depth error based on both the current depth and the requested depth; (4) determine the at least one speed instruction in response to determining the depth error; and (5) determine the at least one tension instruction in response to determining the depth error.

For example, see FIG. 4A.

Example 4d. The system of Example 3d, wherein the at least one controller is configured to actuate the motor to automate depth positioning of the line portion in proportion to a size of the depth error.

For example, the at least one controller may more aggressively manipulate the line portion if the depth error is particularly large. For example, this may be achieved via a proportional based control loop.

This proportional control management may occur via any or all of, for example, a depth control loop, a tension control loop, and/or a speed control loop. For example, an embodiment may include a depth control loop with proportional management but have tension and/or speed control loops that do not necessarily have proportional control management.

Example 5d. The system according to any of Examples 3d-4d, wherein the at least one controller is configured to actuate the motor to automate depth positioning of the line portion based on a historic cumulative longevity of the depth error.

For example, the at least one controller may more aggressively manipulate the line portion if the depth error has existed for a prolonged period of time. For example, this may be achieved via an integrative based control loop.

By use of "according to any of Examples 3d-4d", please note an embodiment may include both proportional and integrative based control loops or just one of those loops.

Example 6d. The system according to any of Examples 3d-5d, wherein the at least one controller is configured to actuate the motor to automate depth positioning of the line portion based a rate of change of the depth error.

For example, the at least one controller may more aggressively manipulate the line portion if the depth error change is more rapid or more less rapid depending on task characteristics. For example, this may be achieved via a derivative based control loop. This may relate in anticipatory control.

Example 7d. The system according to any of Examples 2d-6d, wherein the at least one controller is configured to: (1) determine a target speed for the line portion; (2) determine a current speed of the line portion based on the monitored speed of the line portion; (3) determine a speed error based on both the current speed and the target speed; (4) determine the at least one speed instruction in response to determining the speed error.

For example, see FIG. 4B.

Example 8d. The system according to Example 7d, wherein the at least one controller is configured to actuate the motor to automate depth positioning of the line portion in proportion to a size of the speed error.

Example 9d. The system according to any of Examples 7d-8d, wherein the at least one controller is configured to actuate the motor to automate depth positioning of the line portion based a historic cumulative longevity of the speed error.

Example 10d. The system according to any of Examples 7d-9d, wherein the at least one controller is configured to actuate the motor to automate depth positioning of the line portion based a rate of change of the speed error.

Example 10.1d The system according to any of Examples 7d-9d, wherein the at least one controller is configured to determine the speed error after determining the depth error.

Example 11d. The system according to any of Examples 2d-10d, wherein the at least one controller is configured to: (1) determine a target tension for the line; (2) determine a current tension of the line based on the monitored tension of the line; (3) determine a tension error based on both the current tension and the target tension; (4) determine the at least one tension instruction in response to determining the tension error.

For example, see FIG. 4C.

Example 12d. The system according to Example 11d, wherein the at least one controller is configured to actuate the motor to automate depth positioning of the line portion in proportion to a size of the tension error.

Example 13d. The system according to any of Examples 11d-12d, wherein the at least one controller is configured to actuate the motor to automate depth positioning of the line portion based a historic cumulative longevity of the tension error.

Example 14d. The system according to any of Examples 11d-13d, wherein the at least one controller is configured to actuate the motor to automate depth positioning of the line portion based a rate of change of the tension error.

Example 15d. The system according to any of Examples 11d-14d, wherein the at least one controller is configured to determine the tension error after determining the depth error.

Example 16d. The system according to any of Examples 11d-15d, wherein the at least one controller is configured to actuate the motor to automate depth positioning of the line portion based on a maximum tension input received via at least one of a user interface or an application program interface (API).

Example 17d. The system according to any of Examples 16d, wherein the at least one controller is configured to: (1) determine the line portion is to be moved up and not down; (2) in response to determining the line portion is to be moved up and not down, determine the tension error based on the maximum tension input.

Example 18d. The system according to any of Examples 11d-15d, wherein the at least one controller is configured to actuate the motor to automate depth positioning of the line portion based on a minimum tension input received via at least one of a user interface or an application program interface (API).

Example 19d. The at least one medium of Example 18d, the operations comprising: (1) determine the line portion is to be moved down and not up; (2) in response to determining the line portion is to be moved down and not up, determine the tension error based on the minimum tension input.

Example 1e. At least one machine-readable medium having stored thereon data which, if used by at least one machine, causes the at least one machine to perform operations comprising: (1) actuate a motor to automate depth positioning of a line portion based on each of: (a) a monitored depth of the line portion, (b) a monitored speed of the line portion, and (c) a monitored tension of the line; (2) wherein: (a) the line portion is a portion of a line and the line includes at least one of a wire line, a slick line, or combinations thereof; (b) the line is coupled to a spool, and (c) the spool is coupled to a motor and the motor is configured to actuate the spool to raise or lower the line portion.

Example 2e. The at least one medium of Example 1e, wherein the operations comprise: (1) determine at least one speed instruction based on the monitored speed of the line portion; (2) determine at least one tension instruction based on the monitored tension of the line; (3) communicate the at least one speed instruction and the at least one tension instruction to the motor to actuate the motor to automate depth positioning of the line portion.

Example 3e. The at least one medium of Example 2e, wherein the operations comprise: (1) in response to a depth input from at least one of a user interface or an application program interface (API), determine a requested depth for the line portion; (2) determine a current depth of the line portion based on the monitored depth of the line portion; (3) determine a depth error based on both the current depth and the requested depth; (4) determine the at least one speed instruction in response to determining the depth error; and (5) determine the at least one tension instruction in response to determining the depth error.

Example 4e. The at least one medium of Example 3e, wherein the operations comprise actuate the motor to automate depth positioning of the line portion in proportion to a size of the depth error.

Example 5e. The at least one medium according to any of Examples 3e-4e, wherein the operations comprise actuate the motor to automate depth positioning of the line portion based a historic cumulative longevity of the depth error.

Example 6e. The at least one medium according to any of Examples 3e-5e, wherein the operations comprise actuate the motor to automate depth positioning of the line portion based a rate of change of the depth error.

Example 7e. The at least one medium according to any of Examples 2e-6e, wherein the operations comprise: (1) determine a target speed for the line portion; (2) determine a current speed of the line portion based on the monitored speed of the line portion; (3) determine a speed error based on both the current speed and the target speed; (4) determine the at least one speed instruction in response to determining the speed error.

Example 8e. The at least one medium according to Example 7e, wherein the operations comprise actuate the motor to automate depth positioning of the line portion in proportion to a size of the speed error.

Example 9e. The at least one medium according to any of Examples 7e-8e, wherein the operations comprise actuate the motor to automate depth positioning of the line portion based a historic cumulative longevity of the speed error.

Example 10e. The at least one medium according to any of Examples 7e-9e, wherein the operations comprise actuate the motor to automate depth positioning of the line portion based a rate of change of the speed error.

Example 10.1e The at least one medium according to any of Examples 7e-9e, wherein the operations comprise determine the speed error after determining the depth error.

Example 11e. The at least one medium according to any of Examples 2e-10e, wherein the operations comprise: (1) determine a target tension for the line; (2) determine a current tension of the line based on the monitored tension of the line; (3) determine a tension error based on both the current tension and the target tension; (4) determine the at least one tension instruction in response to determining the tension error.

Example 12e. The at least one medium according to Example 11e, wherein the operations comprise actuate the motor to automate depth positioning of the line portion in proportion to a size of the tension error.

Example 13e. The at least one medium according to any of Examples 11e-12e, wherein the operations comprise actuate the motor to automate depth positioning of the line portion based a historic cumulative longevity of the tension error.

Example 14e. The at least one medium according to any of Examples 11e-13e, wherein the operations comprise actuate the motor to automate depth positioning of the line portion based a rate of change of the tension error.

Example 15e. The at least one medium according to any of Examples 11e-14e, wherein the operations comprise determine the tension error after determining the depth error.

Example 16e. The at least one medium according to any of Examples 11e-15e, wherein the operations comprise actuate the motor to automate depth positioning of the line portion based on a maximum tension input received via at least one of a user interface or an application program interface (API).

Example 17e. The at least one medium according to any of Examples 16e, wherein the operations comprise: (1) determine the line portion is to be moved up and not down; (2) in response to determining the line portion is to be moved up and not down, determine the tension error based on the maximum tension input.

Example 18e. The at least one medium according to any of Examples 11e-15e, wherein the operations comprise actuate the motor to automate depth positioning of the line portion based on a minimum tension input received via at least one of a user interface or an application program interface (API).

Example 19e. The at least one medium of Example 18e, the operations comprising: (1) determine the line portion is to be moved down and not up; (2) in response to determining the line portion is to be moved down and not up, determine the tension error based on the minimum tension input.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a side of a substrate is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A system comprising:
    a line including at least one of a wire line, a slick line, or combinations thereof, the line including a line portion;
    a spool coupled to the line and a motor coupled to the spool, the motor being configured to actuate the spool to raise or lower the line portion;
    at least one processor coupled to at least one sensor, a user interface, and at least one memory, the at least one processor being configured to:
        in response to a depth input from the user interface, determine a requested depth for the line portion;
        in response to data from the at least one sensor, determine a current depth of the line portion, a current speed of the line portion, and a current tension of the line;

determine a depth error based on both the current depth and the requested depth;
determine a requested movement of the line portion via a depth proportional-integral-derivative (PID) control loop, the depth PID control being based on the depth error;
determine a speed error based on both the requested movement and the current speed;
determine one or more speed instructions via a speed PID control loop, the speed PID control loop being based on the speed error;
determine a tension error based on both the requested movement and the current tension;
determine one or more tension instructions via a tension PID control loop, the tension PID control loop being based on the tension error;
actuate the motor based on both the one or more speed instructions and the one or more tension instructions to adjust a depth of the line portion.

2. The system of claim 1, wherein the at least one processor is configured to:
in response to a maximum tension input from the user interface, determine the one or more tension instructions via the tension PID control loop, the tension PID control loop being based on the maximum tension input.

3. The system of claim 2, wherein the at least one processor is configured to:
determine the requested movement is to move the line portion up and not down;
in response to determining the requested movement is to move the line portion up and not down, determine the tension error based on the maximum tension input.

4. The system of claim 1, wherein the at least one processor is configured to:
in response to a minimum tension input from the user interface, determine the one or more tension instructions via the tension PID control loop, the tension PID control loop being based on the minimum tension input.

5. The system of claim 4, wherein the at least one processor is configured to:
determine the requested movement is to move the line portion down and not up;
in response to determining the requested movement is to move the line portion down and not up, determine the tension error based on the minimum tension input.

6. The system of claim 1, wherein the speed error and the tension error are both based on the requested movement.

7. The system of claim 6, wherein:
the requested movement is a set point for the speed PID control loop;
the requested movement, after modification with a tension limit, is a set point for the tension PID control loop.

8. The system of claim 1, wherein the at least one processor includes a depth PID controller to operate the PID control loop, a tension PID controller to operate the tension PID control loop, and a speed PID controller to operate the speed PID control loop.

9. The system of claim 1, wherein the one or more speed instructions comprise a speed control manipulated variable and the one or more tension instructions comprise a tension control manipulated variable.

10. The system of claim 1, wherein:
the tension PID control loop applies correction to the tension error based on proportional, integral, and derivative tension terms;
the speed PID control loop applies correction to the speed error based on proportional, integral, and derivative speed terms;
the depth PID control loop applies correction to the depth error based on proportional, integral, and derivative depth terms.

11. A system comprising:
a line including at least one of a wire line, a slick line, or combinations thereof, the line including a line portion;
a spool coupled to the line and a motor coupled to the spool, the motor being configured to actuate the spool to raise or lower the line portion;
at least one processor coupled to at least one sensor, at least one of a user interface or an application program interface (API), and at least one memory, the at least one processor being configured to:
in response to a depth input from the at least one of a user interface or an API, determine a requested depth for the line portion;
in response to data from the at least one sensor, determine a current depth of the line portion, a current speed of the line portion, and a current tension of the line;
determine a depth error based on both the current depth and the requested depth;
determine a requested movement of the line portion based on the depth error;
determine a speed error based on both the requested movement and the current speed;
determine one or more speed instructions based on the speed error;
determine a tension error based on both the requested movement and the current tension;
determine one or more tension instructions based on the tension error;
actuate the motor based on both the one or more speed instructions and the one or more tension instructions to adjust a depth of the line portion.

12. The system of claim 11, wherein the at least one processor is configured to:
determine the requested movement via a depth multi-term control loop, the depth multi-term control loop being based on the depth error;
determine the one or more speed instructions via a speed multi-term control loop, the speed multi-term control loop being based on the speed error;
determine the one or more tension instructions via a tension multi-term control loop, the tension multi-term control loop being based on the tension error.

13. The system of claim 11, wherein the at least one processor is configured to:
in response to a maximum tension input from the at least one of a user interface or an API, determine the one or more tension instructions based on the maximum tension input.

14. The system of claim 13, wherein the at least one processor is configured to:
determine the requested movement is to move the line portion up and not down;
in response to determining the requested movement is to move the line portion up and not down, determine the tension error based on the maximum tension input.

15. The system of claim 11, wherein the at least one processor is configured to:

in response to a minimum tension input from the at least one of a user interface or an API, determine the one or more tension instructions based on the minimum tension input.

* * * * *